(12) United States Patent
Malvern

(10) Patent No.: US 10,900,994 B2
(45) Date of Patent: Jan. 26, 2021

(54) ACCELEROMETER CONTROL

(71) Applicant: Atlantic Inertial Systems, Limited, Plymouth (GB)

(72) Inventor: Alan Malvern, Plymouth (GB)

(73) Assignee: ATLANTIC INERTIAL SYSTEMS, LIMITED, Plymouth (GB)

( * ) Notice: Subject to any disclaimer, the term of this patent is extended or adjusted under 35 U.S.C. 154(b) by 275 days.

(21) Appl. No.: 15/782,982

(22) Filed: Oct. 13, 2017

(65) Prior Publication Data
US 2018/0128851 A1 May 10, 2018

(30) Foreign Application Priority Data
Nov. 9, 2016 (GB) .................. 1618930.0

(51) Int. Cl.
*G01P 15/11* (2006.01)
*G01P 15/08* (2006.01)
(Continued)

(52) U.S. Cl.
CPC .............. *G01P 15/11* (2013.01); *G01P 15/08* (2013.01); *G01P 15/125* (2013.01); *G01P 15/131* (2013.01); *G01P 15/132* (2013.01)

(58) Field of Classification Search
CPC ........ G01P 15/08; G01P 15/11; G01P 15/125; G01P 15/131; G01P 15/132;
(Continued)

(56) References Cited

U.S. PATENT DOCUMENTS 5,142,921 A 9/1992 Stewart et al.
5,563,343 A 10/1996 Shaw et al.
(Continued)

FOREIGN PATENT DOCUMENTS

CN 105785075 A 7/2016
EP 2952909 A1 12/2015
(Continued)

OTHER PUBLICATIONS

European Search Report for Application No. 17197966.9-1022 dated Jan. 31, 2018, 8 pages.
(Continued)

*Primary Examiner* — Randy W Gibson
*Assistant Examiner* — Gedeon M Kidanu
(74) *Attorney, Agent, or Firm* — Cantor Colburn LLP

(57) ABSTRACT

An accelerometer closed loop control system comprising: a capacitive accelerometer comprising a proof mass moveable relative to first and second fixed capacitor electrodes; a PWM generator to generate in-phase and anti-phase PWM drive signals with an adjustable mark/space ratio, wherein said drive signals are applied to the first and second electrodes such that they are charged alternately; an output signal detector to detect a pick-off signal from the accelerometer representing a displacement of the proof mass from a null position to provide an error signal, wherein the null position is the position of the proof mass relative to the fixed electrodes when no acceleration is applied; a PWM servo operating in closed loop to vary the mark/space ratio of said PWM drive signals in response to the error signal so that mechanical inertial forces are balanced by electrostatic forces.

15 Claims, 6 Drawing Sheets

(51) Int. Cl.
*G01P 15/125* (2006.01)
*G01P 15/13* (2006.01)

(58) Field of Classification Search
CPC ......... G01P 2015/0814; G01P 15/0802; G01P 15/097; G01P 15/13; G01P 15/18; G01P 1/006; G01P 2015/0865; G01P 21/00; G01C 19/5677; G01C 19/5684; G01C 19/5762
USPC ...................................................... 73/514.32
See application file for complete search history.

(56) References Cited

U.S. PATENT DOCUMENTS

| | | | |
|---|---|---|---|
| 6,691,572 B1 | 2/2004 | Handrich | |
| 2006/0112765 A1* | 6/2006 | Malvern | G01P 15/0802 73/514.32 |
| 2007/0028689 A1 | 2/2007 | Vrcelj | |
| 2011/0113880 A1 | 5/2011 | Schmid et al. | |
| 2015/0276407 A1 | 10/2015 | Bhandari | |
| 2015/0346236 A1* | 12/2015 | Flamm | G01P 15/131 73/514.32 |
| 2016/0252544 A1* | 9/2016 | Malvern | G01P 15/13 73/514.32 |
| 2017/0089947 A1* | 3/2017 | Townsend | G01P 15/131 |
| 2017/0227572 A1* | 8/2017 | Malvern | G01P 15/125 |

FOREIGN PATENT DOCUMENTS

| | | | |
|---|---|---|---|
| GB | 2524245 | A | 9/2015 |
| GB | 2527595 | A | 12/2015 |
| WO | 0116606 | A1 | 3/2001 |
| WO | 2015052487 | A1 | 4/2015 |

OTHER PUBLICATIONS

Intellectual Property Office Search Report for International Application No. 1618930.0 dated May 9, 2017, 4 pages.

* cited by examiner

ACCELEROMETER CONTROL

This application claims priority to Great Britain Patent Application No. 1618930.0 filed Nov. 9, 2016, the entire contents of which is incorporated herein by reference.

TECHNICAL FIELD

The present disclosure relates to accelerometers, particularly capacitive accelerometers operated in closed loop.

BACKGROUND

Capacitive accelerometers are typically manufactured from silicon as micro-electromechanical systems (MEMS) devices. These small devices typically comprise a proof mass moveably mounted relative to a support or "substrate" using compliant support legs and sealed so that a gaseous medium trapped inside the device provides damping for the proof mass when it moves in a sensing direction in response to an acceleration being applied. In a capacitive accelerometer, there is typically provided a set of fixed electrodes and a set of moveable electrodes attached to the proof mass, with the differential capacitance between the electrodes being measured so as to detect deflection of the proof mass. The resonant frequency of the MEMS device is defined by the mass of the proof mass and the positive spring constant of the compliant support legs.

Such capacitive accelerometers can suffer from a "negative spring rate", wherein the attractive electrostatic force between the proof mass and an electrode increases as the displacement of the proof mass increases. That is to say, the attractive electrostatic force gives rise to an effective "negative spring" that operates in the opposite direction to a conventional "positive spring" like that provided by the compliant support legs. This happens by virtue of Coulomb's law—as the proof mass is displaced from the null position, the attractive force between it and the electrode that is closer to the proof mass as a result of the displacement is increased while the attractive force between the proof mass and the other electrode decreases. Such a situation is clearly unstable, as a slight displacement of the proof mass may result in the attractive electrostatic force acting in the same direction as the force from the acceleration, rendering it more difficult to restore the proof mass to the null position under closed loop operation.

U.S. Pat. No. 5,142,921 describes the use of a "constant charge forcing" regime for operating a capacitive accelerometer under closed loop. In this case the "high tension" (HT) voltage applied to each electrode—i.e. the peak amplitude of the restorative voltage applied to the electrodes—changes differentially as the proof mass moves from the null point in such a way that the attractive electrostatic force is independent of position, nullifying the negative electrostatic spring constant. U.S. Pat. No. 5,142,921 uses a time multiplexed approach, wherein a fixed current is applied for a particular time so as to provide a fixed charge to the electrodes, alternating between an electrode on one side of the proof mass and an electrode on the opposite side of the proof mass. This gives rise to a differential peak voltage which is indicative of the proof mass being offset from the null position. This differential voltage signal is then used to drive a pulse width modulation (PWM) generator with an integral loop filter to restore the proof mass to the null position, wherein an unequal mark/space ratio (i.e. not 50:50) of the PWM drive signals offsets the inertial acceleration force.

However, such conventional approaches typically provide a suitable open loop gain within only a particular frequency range, outside of which the accelerometer suffers from bias shifts when under stress. It will be appreciated that the PWM drive signals are typically of a much greater frequency than the resonant frequency of the MEMS device. By way of non-limiting example only, 48 kHz PWM drive signals may be applied to a MEMS device with a resonant frequency of 3 kHz.

SUMMARY

According to a first aspect of this disclosure there is provided an accelerometer closed loop control system comprising: a capacitive accelerometer comprising a proof mass moveable relative to first and second fixed capacitor electrodes; a pulse width modulation (PWM) generator arranged to generate in-phase and anti-phase PWM drive signals with a drive frequency and an adjustable mark/space ratio, wherein said in-phase and anti-phase PWM drive signals are applied to the first and second fixed capacitor electrodes respectively such that they are charged alternately; an output signal detector arranged to detect a pick-off signal from the accelerometer representing a displacement of the proof mass from a null position to provide an error signal, wherein the null position is the position of the proof mass relative to the first and second fixed capacitor electrodes when no acceleration is applied; a PWM servo operating in closed loop arranged to vary the adjustable mark/space ratio of said in-phase and anti-phase PWM drive signals in response to the error signal so that mechanical inertial forces are balanced by electrostatic forces to maintain the operating point of the proof mass at the null position; and a differential voltage servo arranged to vary a difference in amplitude between the in-phase and anti-phase PWM drive signals in response to the error signal.

Thus in accordance with this disclosure, a capacitive accelerometer operated in closed loop may avoid the negative spring rate issues suffered by conventional accelerometers. By varying a differential voltage applied to the two capacitor electrodes in response to the error signal, the electrostatic force can be kept substantially constant regardless of any displacement of the proof mass due to an applied acceleration. This can substantially reduce if not completely remove the effects of the negative spring rate on the accelerometer.

The Applicant has appreciated that an accelerometer in accordance with this disclosure may enable the use of lower resonant frequency MEMS devices with higher open loop gain, reducing the impact of bias effects caused by mechanical stressing of the MEMS device. For example, a 3.5 kHz MEMS may undergo a displacement of 20 nm/g whereas a 1 kHz MEMS may undergo a displacement of 200 nm/g, such that a 1 nm stress error has ten times smaller an effect on bias offset for the latter device when compared to the former device, increasing the sensitivity of the device. In a conventional accelerometer, the "g range" (i.e. the acceleration range the device can measure) is directly related to the resonant frequency of the MEMS device. However, the g range of an accelerometer in accordance with this disclosure is decoupled from the resonant frequency of the MEMS, advantageously allowing the use of lower resonant frequencies while maintaining a high g range.

In some preferred examples, the differential voltage servo comprises a microcontroller arranged to produce first and second digital control words, wherein: said first digital control word is input to a first digital to analogue converter arranged to receive the in-phase PWM signal at a first reference input and output a scaled in-phase PWM signal; and said second digital control word is input to a second digital to analogue converter arranged to receive the anti-phase PWM signal at a second reference input and output a scaled anti-phase PWM signal. In such examples, these digital control words are converted by the appropriate digital to analogue converters to scale the analogue output voltages that are applied to the first and second capacitor electrodes.

In some examples, the output signal detector comprises a charge amplifier having an input connected to the proof mass and an output, said charge amplifier being arranged to produce at its output a voltage proportional to the capacitance between the proof mass and whichever of the first and second capacitor electrodes is charged at any given time. Such a charge amplifier acts so as to integrate the current applied at its input and produce an output voltage proportional to the integrated current (i.e. the charge accumulated over a period of time). As the charge built up will be proportional to the capacitance between the proof mass and the currently charged capacitor electrode, the voltage produced at the output of the charge amplifier is a measure of displacement of the proof mass.

In a preferred set of such examples, the output signal detector further comprises a demodulator having an input connected to the output of the charge amplifier, wherein said demodulator is arranged to: sample the output of the charge amplifier while the in-phase PWM signal is high so as to produce a first sample; sample the output of the charge amplifier while the anti-phase PWM signal is high so as to produce a second sample; and calculate a difference between said first and second samples; and produce the error signal, wherein the error signal is dependent on said difference.

Thus it will be appreciated that in accordance with such examples, the demodulator obtains a measure of the capacitance between the proof mass and each of the capacitor electrodes while the capacitor formed therebetween is "active" i.e. the capacitor electrode in question is receiving a high PWM signal at the time while the other capacitor electrode is receiving a low PWM signal (typically 0 V).

In some such examples, the PWM servo comprises an integral loop filter arranged to vary the adjustable mark/space ratio in response to the integral of the error signal. Thus it will be seen that in accordance with such examples, the error signal is used to drive a PWM generator with an integral loop filter in order to restore the proof mass to the null position, wherein the mark/space ratio of the PWM drive signals offsets any applied inertial acceleration force. The integral loop filter provides large DC gain and so the PWM servo responds to relatively steady accelerations. From the geometry of the device and a knowledge of the HT voltage, a linear relationship between the demodulator output signal and proof mass displacement may be obtained for any particular device. While in accordance with such examples integral control is used to set the PWM to null the inertial force, this may be extended to proportional-integral-differential (PID) control in order to optimize loop stability.

In a set of potentially overlapping examples, the differential voltage servo is arranged to vary the difference in amplitude between the in-phase and anti-phase PWM drive signals in proportion to the error signal. It will be appreciated that, in accordance with such examples, a proportional servo varies the HT voltages applied to each of the first and second fixed capacitor electrodes differentially. In contrast to integral control, the proportional control provided in such examples allows the differential voltage servo to respond to short-term accelerations such as shocks and vibrations. By way of non-limiting example only, this may be achieved using a digital to analogue convertor (DAC) on the output of an accelerometer such as the "Vesta" application specific integrated circuit (ASIC) product available from Silicon Sensing Systems Ltd. controlled by the output of such a proportional servo. Thus it is an approximate constant charge forcing scheme that may be compatible with existing accelerometers.

It will be appreciated that in the set of examples where the PWM servo provides integral control and the differential voltage servo provides proportional control, both will inevitably respond to accelerations that cause the proof mass to move. However under low frequency accelerations, the PWM servo dominates due to the integral term.

In some such examples, the demodulator is further arranged to receive a synchronisation signal, wherein the demodulator uses said synchronisation signal to produce the error signal at a predetermined frequency. In preferred examples, the predetermined frequency is the drive frequency. In such examples, the demodulator determines the difference between the first and second samples obtained from the proof mass at least once per cycle of the drive frequency and produces the error signal in time for the next application of the PWM drive signals to the capacitor electrodes.

While the error signal could be an analogue signal, in preferred examples the error signal is digital. This allows, for example, the error signal to be input directly into the digital to analogue converters so as to scale the voltages applied to the first and second capacitor electrodes.

According to a second aspect of this disclosure there is provided a closed loop method of controlling a capacitive accelerometer comprising a proof mass moveable relative to first and second fixed capacitor electrodes, the method comprising: applying in-phase and anti-phase pulse width modulation (PWM) drive signals to the first and second fixed capacitor electrodes with an adjustable mark/space ratio; detecting a pick-off signal from the accelerometer representing a displacement of the proof mass from a null position to provide an error signal, wherein the null position is the position of the proof mass relative to the first and second fixed capacitor electrodes when no acceleration is applied; operating in closed loop by varying the adjustable mark/space ratio of said in-phase and anti-phase PWM drive signals in response to the error signal so that mechanical inertial forces are balanced by electrostatic forces to maintain the operating point of the proof mass at the null position; and using the error signal so as to vary a differential voltage between the in-phase and anti-phase PWM drive signals.

The preferred and optional features described hereinabove in relation to the first aspect apply equally to the second aspect.

Certain examples of the disclosure will now be described, by way of example only, with reference to the accompanying drawings in which.

Figures 1A, 1B:
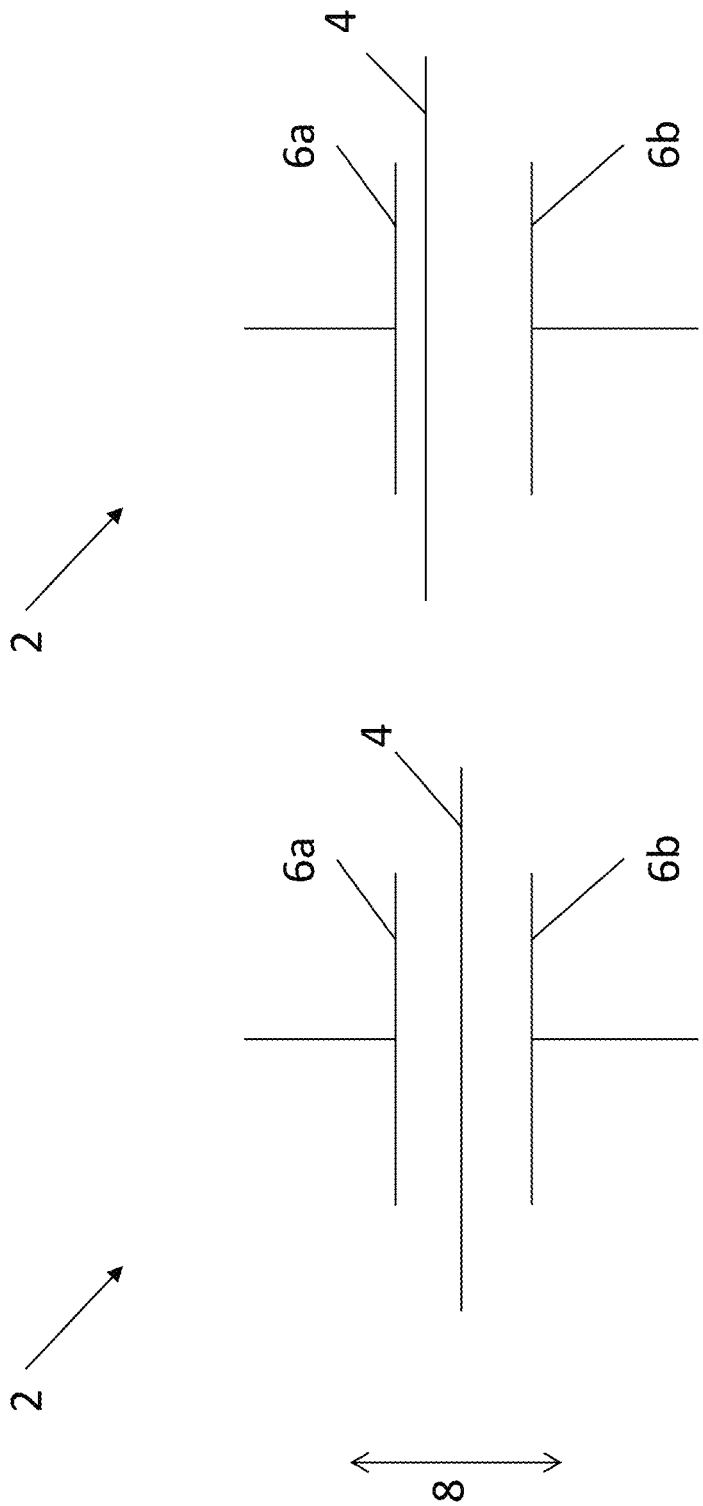
FIGS. 1A and 1B illustrate the operation of a conventional closed loop capacitive accelerometer.

FIGS. 1A and 1B illustrate the operation of a conventional closed loop capacitive accelerometer 2. The accelerometer 2 comprises a moveable proof mass 4 and a pair of fixed capacitor electrodes 6a, 6b. The two fixed capacitor electrodes 6a, 6b are arranged parallel to one another and are situated either side of the proof mass 4. This accelerometer 2 is arranged to determine a linear acceleration in the sensing direction 8 and has the freedom to move along the sensing direction 8 in response to an applied acceleration. FIG. 1A illustrates the case in which the accelerometer 2 is not experiencing any acceleration in the sensing direction 8 (e.g. the accelerometer 2 is at rest or at a constant velocity), and in this case the proof mass 4 remains in the "null position" i.e. it is equidistant from the two fixed capacitor electrodes 6a, 6b.

FIG. 1B illustrates the case in which the accelerometer 2 undergoes an acceleration in the sensing direction 8. As can be seen from the figure, the proof mass 4 has moved closer to the first fixed capacitor electrode 6a and further from the second fixed capacitor electrode 6b such that the spacings are no longer equal. During regular operation pulse width modulated (PWM) signals are applied to the two fixed capacitor electrodes 6a, 6b. The PWM drive signals applied to one capacitor electrode 6a are in anti-phase with the PWM drive signals applied to the other capacitor electrode 6b such that for any given time one of the fixed capacitor electrodes 6a, 6b has a "high" PWM voltage applied to it while the other has a "low" PWM voltage (e.g. 0 V) applied to it.

In such a conventional accelerometer 2, these PWM drive signals represent voltages that are driven to the fixed capacitor electrodes 6a, 6b. Under a "constant charge" regime these PWM drive signals have a known width and height, a known current is applied for a specified amount of time such that a known charge is applied to the fixed capacitor electrodes 6a, 6b. The capacitance of a capacitor is equal to the stored charge divided by the voltage between the two plates and the charge is known from the properties of the PWM drive signals, so the capacitance can be determined by measuring the voltage at the proof mass 4. Alternatively, under a "constant voltage" regime, a known voltage is applied to the fixed capacitor electrodes 6a, 6b and the capacitance can instead be determined by measuring the charge at the proof mass 4 (typically by using a transimpedance or "charge" amplifier). As capacitance is directly proportional to the surface area of the plates and inversely proportional to the distance between them, and the surface area remains constant, the determined capacitance is a direct measure of the distance between the capacitor plates (i.e. the distance between the proof mass 4 and the fixed capacitor electrode 6a, 6b receiving the high PWM signal at any given moment in time).

Figure 2:
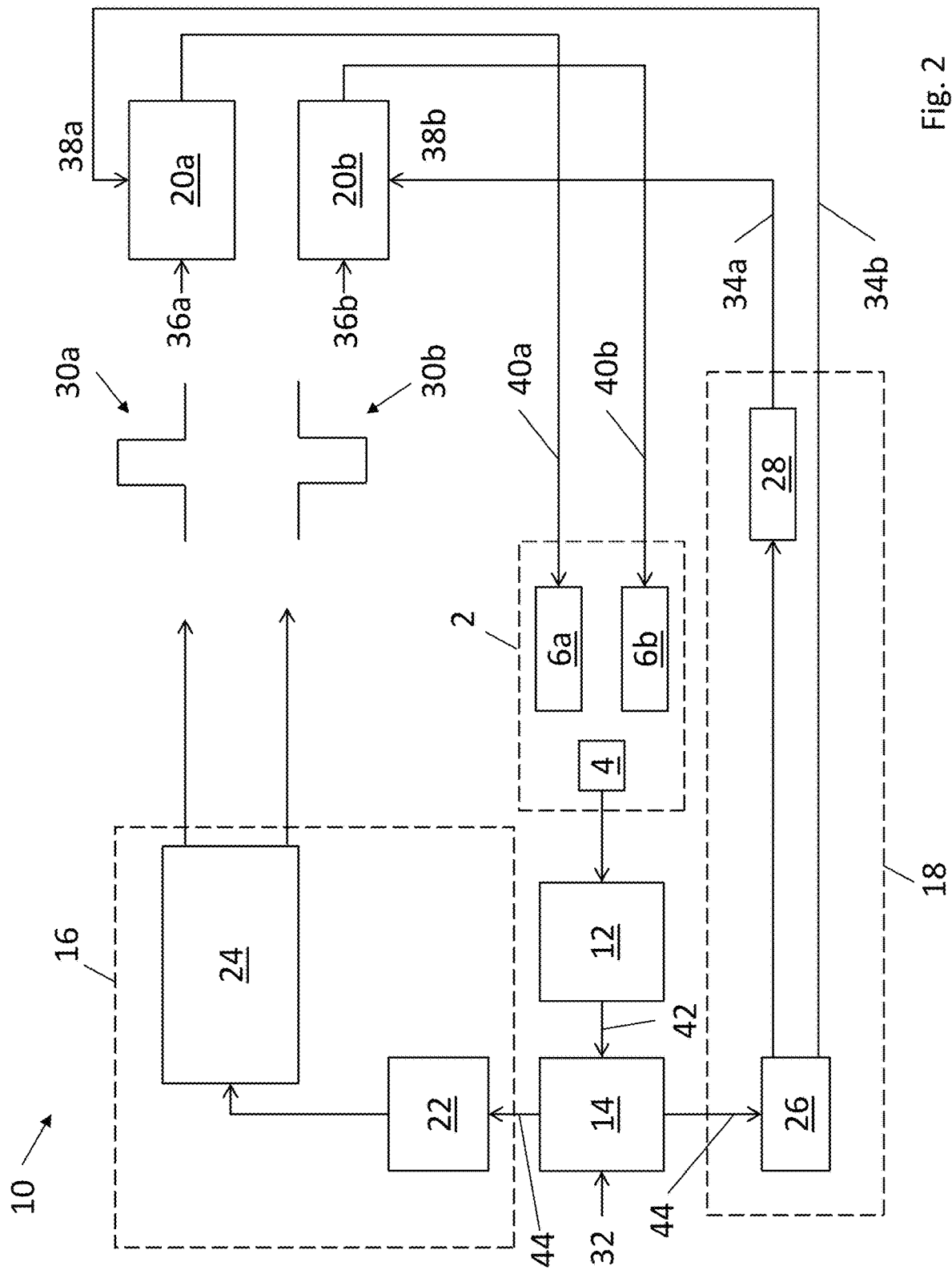
FIG. 2 shows a closed loop accelerometer control system in accordance with the present disclosure.

FIG. 2 shows a closed loop accelerometer control system 10 in accordance with the present disclosure. The closed loop accelerometer control system 10 is used to control the operation of a microelectromechanical systems (MEMS) accelerometer 2 which comprises a moveable proof mass 4 and fixed capacitor electrodes 6a, 6b as described previously with reference to FIGS. 1A and 1B. The control system 10 comprises: a charge amplifier 12; a demodulator 14; a mark space ratio servo 16; a high tension servo 18; and a pair of digital to analogue converters (DACs) 20a, 20b.

The mark space ratio servo 16 comprises a PWM loop filter 22 and a PWM generator 24. The high tension servo 18 comprises a high tension loop filter 26 and an inverter 28. The operation of these two servos 16, 18 will be described in further detail below.

The charge amplifier 12 is arranged such that its input is connected to the proof mass 4 while its output is connected to the input of the demodulator 14. As will be appreciated by those skilled in the art, a charge amplifier produces at its output a voltage that is proportional to the integral of a current at its input, i.e. the voltage 42 at the output is proportional to the charge at the input. Under acceleration, the voltage 42 produced at the output of the charge amplifier 12 will take two different values in each period of the fixed-height PWM drive signals 30a, 30b, wherein one value of the voltage corresponds to the first fixed capacitor electrode 6a being provided with the high PWM signal and the other value corresponds to the other fixed capacitor electrode 6b being connected to a high PWM signal (assuming that the acceleration remains constant throughout the period). The reference voltage $V_{ref}$ (not shown in FIG. 2) used by the charge amplifier 12 may be 0 V, however for ease of illustration in FIGS. 3-6, it is shown to be a non-zero, positive voltage.

The demodulator 14 is arranged to sample the output voltage 42 of the charge amplifier 12 twice per period of the PWM drive signals, once when the in-phase, fixed height PWM signal 30a is high, and once when the anti-phase, fixed height PWM drive signal 30b is high (these timings also correspond to the scaled PWM drive signals 40a and 40b being high respectively, these signals 40a, 40b being discussed in further detail below). The demodulator 14 is arranged to output an error signal 44 proportional to the difference between these two samples and in this example is a digital signal. The demodulator 14 is also arranged to receive a reference signal 32 which is used to synchronise the demodulator 14 with the fixed height PWM drive signals 30a, 30b. This error signal 44 is provided to the mark space ratio servo 16 and the high tension servo 18 as described below.

The mark space ratio servo 16 is arranged to use integral control in order to vary the mark space ratio of the fixed height PWM drive signals 30a, 30b so as to restore the moveable proof mass 4 to the null position during an applied acceleration as is conventional for a closed loop accelerometer. The mark space ratio servo 16 is arranged such that the error signal 44 from the demodulator 14 is input to the PWM loop filter 22 which, based on the sign and magnitude of the error signal 44, produces a control signal that is input to the PWM generator 24. The PWM generator 24 is arranged to produce PWM drive signals 30a and 30b with a fixed amplitude, however it uses the control signal from the PWM loop filter 22 to vary the mark space ratio of these signals i.e. the proportion of time that each of the signals takes its high value in each period. In other words the mark space ratio servo 16 varies the respective duty cycles of the fixed height PWM drive signals 30a, 30b in response to a displacement of the proof mass 4.

By way of contrast, the high tension servo 18 is arranged to vary the amplitude of the PWM drive signals 40a, 40b that are applied to the fixed capacitor electrodes 6a, 6b. The high tension servo 18 is arranged such that the error signal 44 produced by the demodulator 14 is input to a high tension loop filter 26 that employs proportional control to produce a pair of digital control words 34a, 34b that are input to the pair of DACs 20a, 20b respectively. The first digital control word 34a is taken directly from the output of the high tension loop filter 26, while the second digital control word 34b is first passed through the inverter 28. The inverter 28 is arranged to "invert" the second digital control word 34b in the sense that if the first digital control word 34a increases the second digital control word 34b decreases and vice versa. While the value of the two digital control words 34a, 34b may vary in direct proportion to the error signal 44 produced by the demodulator 14, typically they will vary from a standard, non-zero value produced by the high tension loop filter 26 when the proof mass 4 is in the null position.

The two DACs 20a, 20b are arranged to receive the in-phase, fixed height PWM drive signal 30a and the anti-phase, fixed height PWM drive signal 30b at their respective reference voltage inputs 36a, 36b. The DACs 20a, 20b are also arranged to receive the digital control words 34a, 34b at their respective digital inputs 38a, 38b. The outputs of the two DACs 20a, 20b are connected to the two fixed capacitor electrodes 6a, 6b respectively. It will be appreciated that due to their connection to the reference inputs of the DACs 20a, 20b (that are typically used to scale the range of the analogue output), the PWM drive signals 30a, 30b produced by the PWM generator 24 selectively enable and disable the two DACs 20a, 20b at a duty cycle set by the mark space ratio servo 16 while the digital control words 34a, 34b are sampled by the DACs 20a, 20b in order to produce analogue, scaled PWM drive signals 40a, 40b that are applied to the fixed capacitor electrodes 6a, 6b respectively.

While the mark space ratio servo 16 acts to vary the mark space ratio of the drive signals 40a, 40b applied to the fixed capacitor electrodes 6a, 6b in order to maintain the proof mass 4 at the null position, the high tension servo 18 varies a differential voltage between the two drive signals 40a, 40b applied to the capacitor electrodes 6a, 6b so as to ensure that the attractive electrostatic forces between the proof mass 4 and the fixed capacitor electrodes 6a, 6b remains substantially constant regardless of the displacement of the proof mass 4.

Thus the system of the present disclosure uses a constant voltage regime and not a constant charge regime. However, whereas previous constant voltage systems applied the same voltage to each of the capacitor electrodes in their respective half-cycles, and applied the same voltage constantly from one cycle to the next, the control system 10 of the present disclosure varies a differential voltage applied to the capacitor electrodes in their respective half-cycles (i.e. they do not necessarily receive the same voltage) and varies this differential voltage from one PWM cycle to the next. This differential voltage is varied in accordance with displacement of the proof mass 4 such that the electrostatic force between the proof mass 4 and each of the capacitor electrodes 6a, 6b is substantially constant, regardless of the displacement of the proof mass 4. As the electrostatic forces do not vary with proof mass displacement, there is no negative spring contribution from any attractive electrostatic forces while the PWM mark/space ratio provides a direct measure of the applied acceleration.

Figure 3:
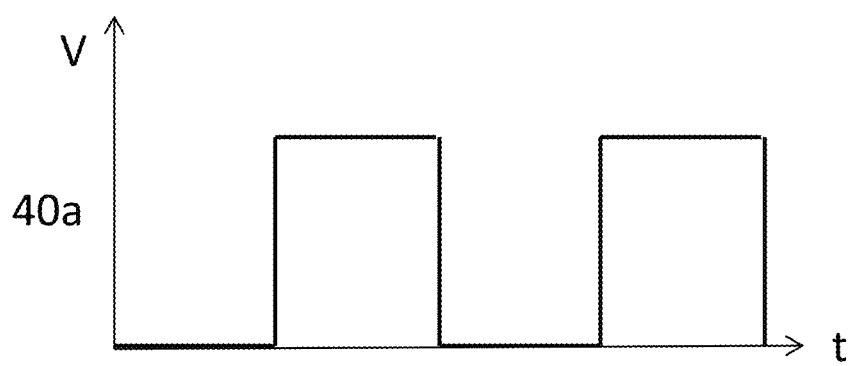
FIG. 3 shows signals typical of the accelerometer control system of FIG. 2 when the proof mass is centred and no acceleration is being applied.
Figure 3:
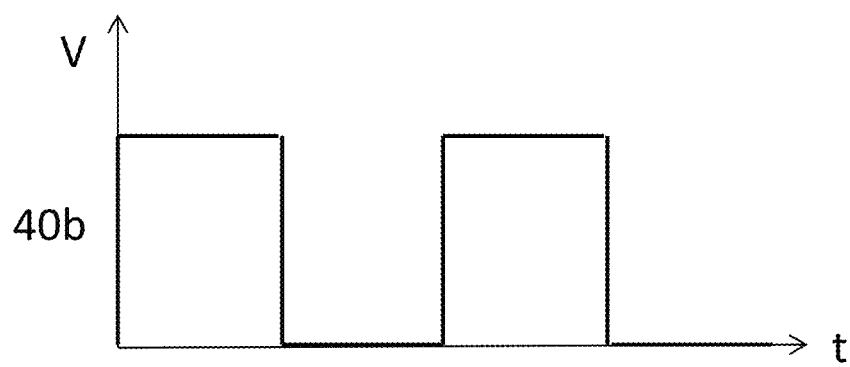
Figure 3:
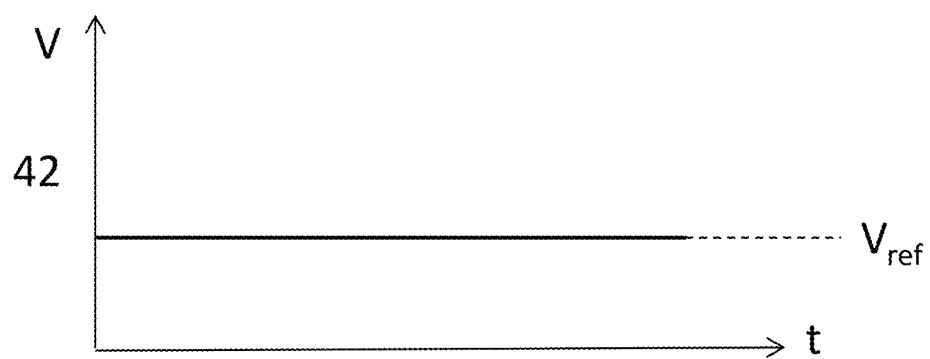

FIG. 3 shows signals typical of the accelerometer control system 10 of FIG. 2 when the proof mass 4 is centred and no acceleration is being applied. In this case, the proof mass 4 is in the null position and the drive signals 40a, 40b have a 50:50 mark space ratio. As the proof mass 4 is in the null position, the output signal 42 produced by the charge amplifier 12 stays at the reference voltage $V_{ref}$.

Figure 4:
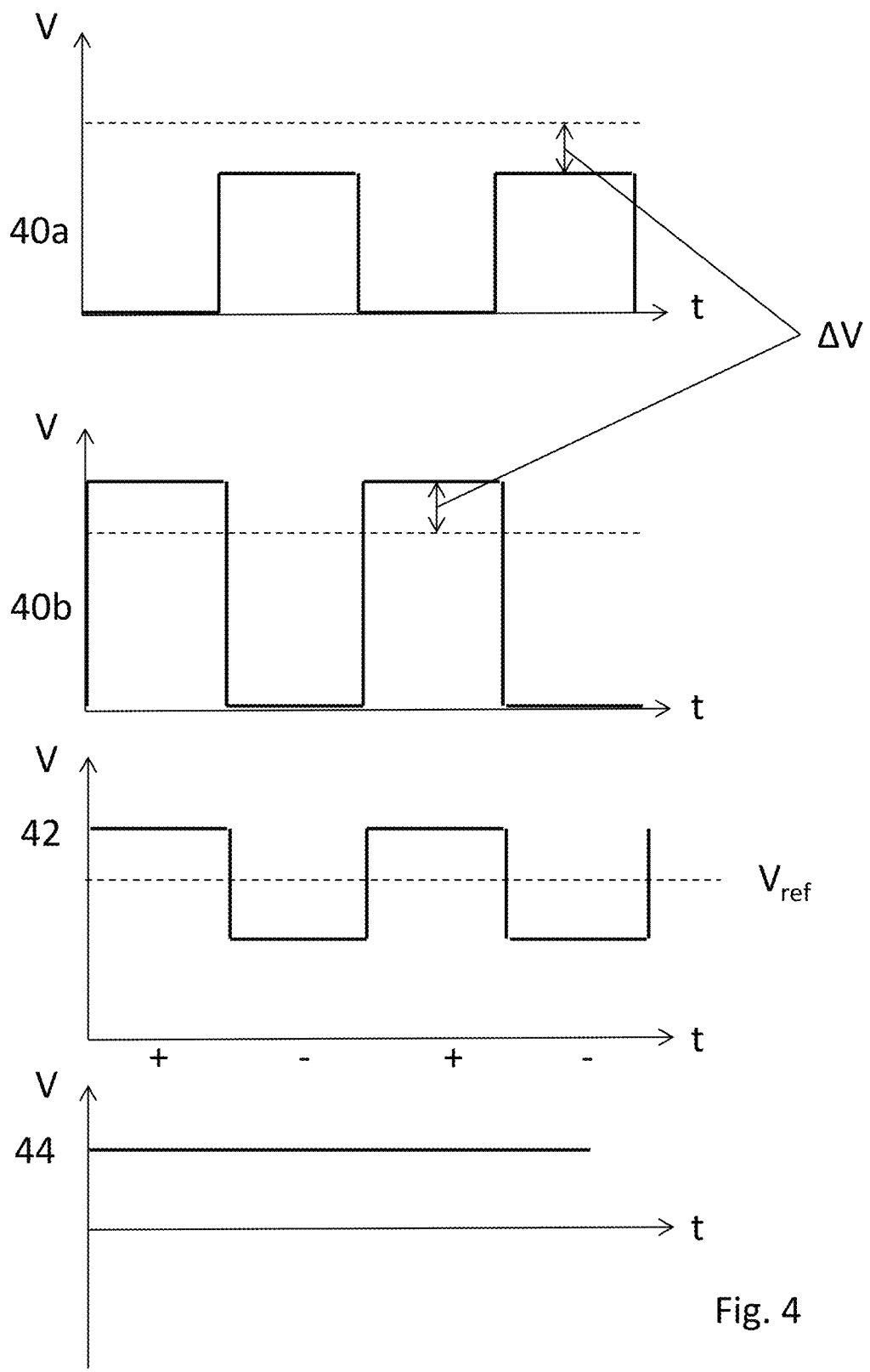
FIG. 4 shows signals typical of the accelerometer control system of FIG. 2 when the proof mass is offset towards one of the capacitor electrodes and no acceleration is being applied.

FIG. 4 shows signals typical of the accelerometer control system 10 of FIG. 2 when the proof mass 4 is offset towards one of the capacitor electrodes 6a and no steady acceleration is being applied. This may occur when the accelerometer is subject to a sudden shock or vibration that momentarily displaces the proof mass 4 and causes the accelerometer control system 10 to act in a manner to null the movement as if it were an applied acceleration. In this case, the charge amplifier 12 produces a square wave output signal 42 that indicates that the proof mass 4 is offset towards the "upper" capacitor electrode 6a. This square wave output signal 42 is defined by $V_{ref}+V_1-V_2$, where $V_1$ is derived from the voltage output from the capacitor formed by the proof mass and the upper capacitor electrode 6a, $V_2$ is derived from the voltage output from the capacitor formed by the proof mass and the lower capacitor electrode 6b, and $V_{ref}$ corresponds to the voltage that the two capacitors would reach when the proof mass 4 is not offset from the null position as described previously with reference to FIG. 3 (i.e. the mean value of the output signal 42 is $V_{ref}$ and the signal fluctuates above and below it by the same amount). It will be appreciated that $V_1$ and $V_2$ may be the output voltages from the two effective capacitors themselves, or may instead be derived from them, e.g. proportional to them with a known scaling factor. The demodulator 14 receives this square wave output signal 42 and produces a positive error signal 44. This positive error signal is used by the high tension servo 18 to set the control words 34a, 34b such that the drive signal 40a applied to the upper capacitor electrode 6a is reduced by an amount $\Delta V$ and the drive signal 40b applied to the "lower" capacitor electrode 6b is increased by the same amount $\Delta V$. With the correct choice of $\Delta V$ determined by the high tension servo 18, a constant spring constant can be achieved regardless of displacement of the proof mass 4.

Figure 5:
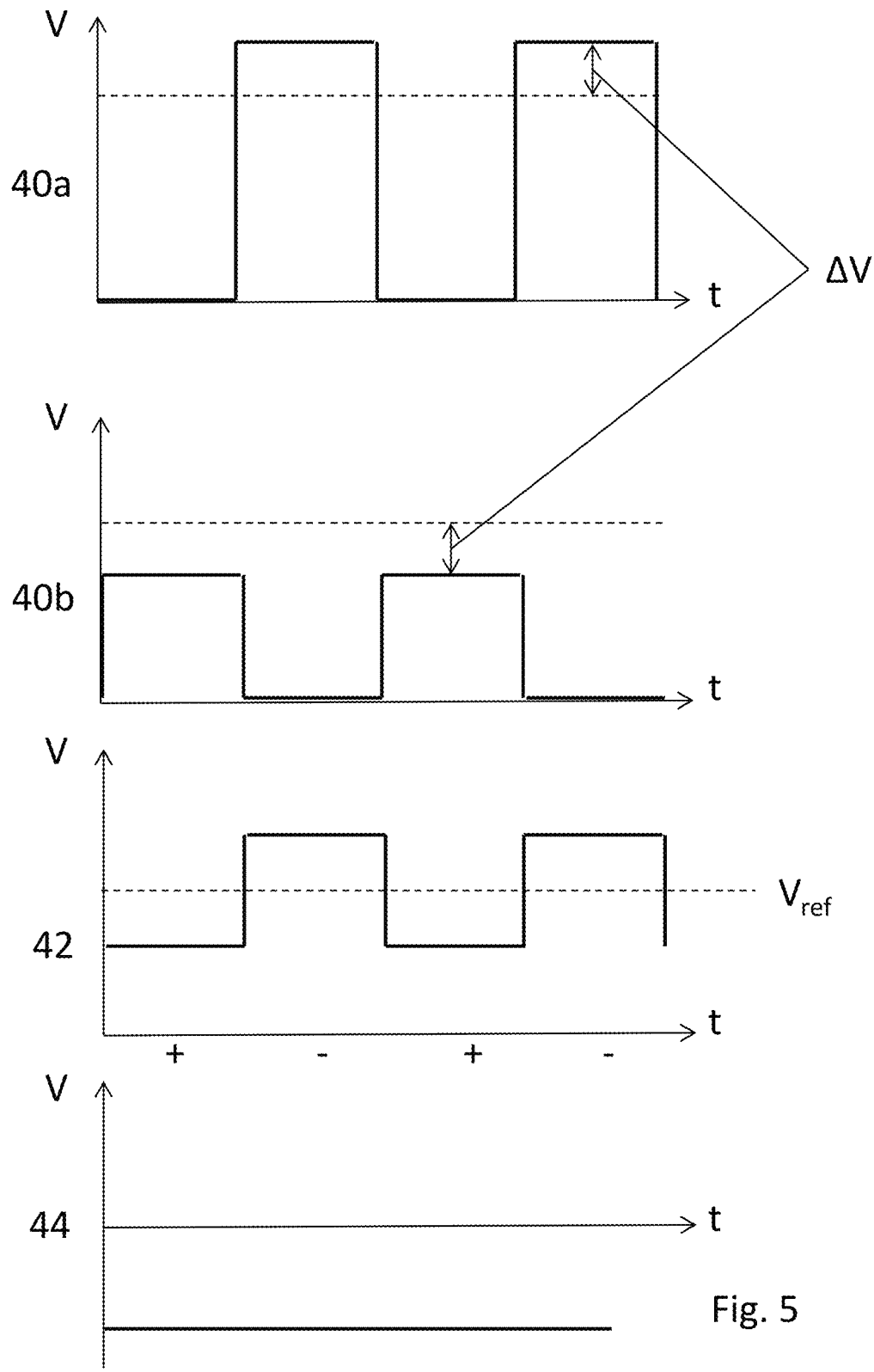
FIG. 5 shows signals typical of the accelerometer control system of FIG. 2 when the proof mass is offset towards the other capacitor electrode and no acceleration is being applied.

FIG. 5 shows signals typical of the accelerometer control system 10 of FIG. 2 when the proof mass 4 is offset towards the other capacitor electrode 6b and no steady acceleration is being applied. In contrast to the case described with reference to FIG. 4, the charge amplifier 12 produces a square wave output signal 42 that indicates that the proof mass 4 is offset towards the "lower" capacitor electrode 6b. The demodulator 14 receives this square wave output signal 42 and produces a negative error signal 44. This negative error signal is used by the high tension servo 18 to set the control words 34a, 34b such that the drive signal 40a applied to the upper capacitor electrode 6a is increased by an amount $\Delta V$ and the drive signal 40b applied to the "lower" capacitor electrode 6b is reduced by the same amount $\Delta V$ (note that the value of $\Delta V$ will not necessarily be the same as described with reference to FIG. 4).

Figure 6:
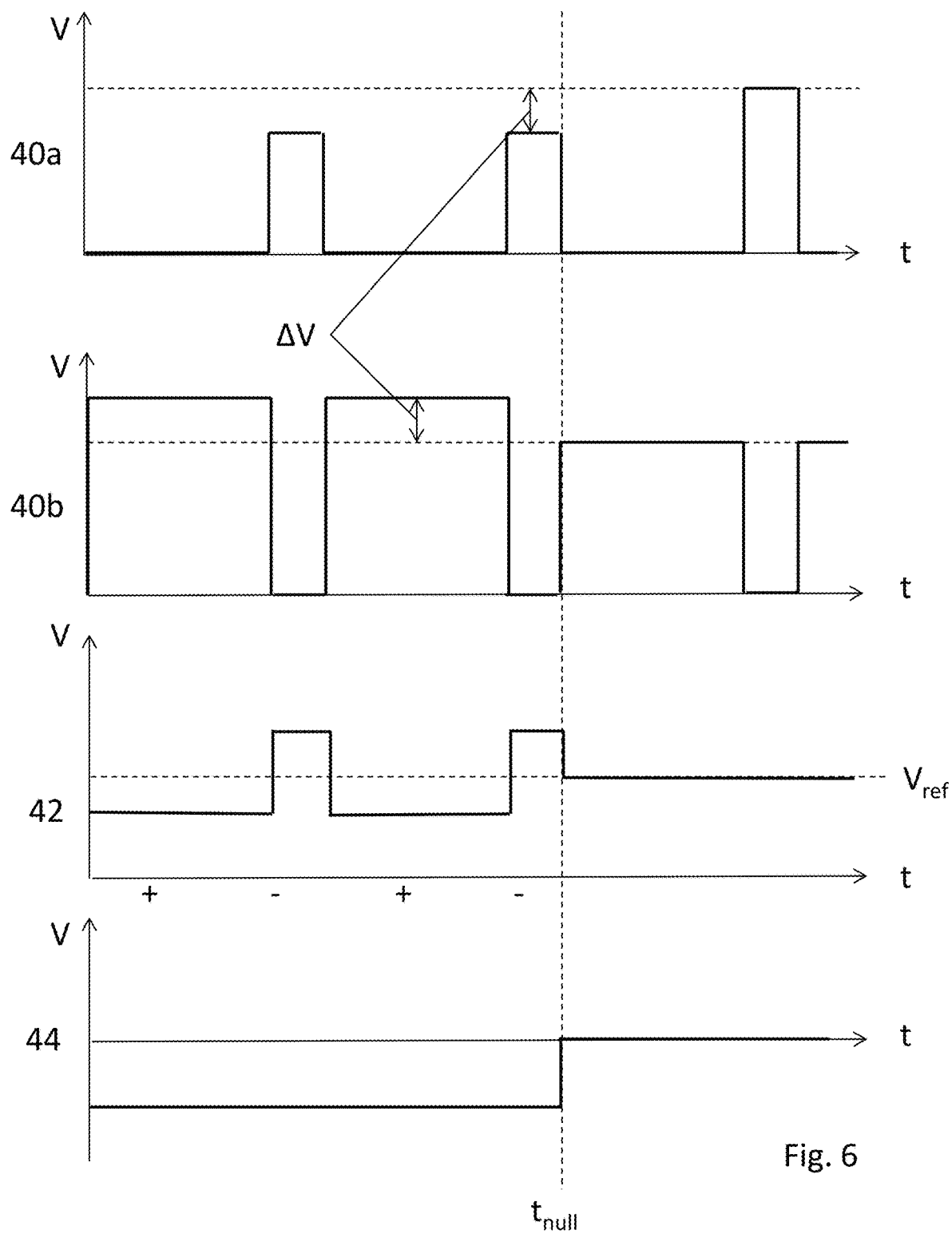
FIG. 6 shows signals typical of the accelerometer control system of FIG. 2 when an acceleration is applied.

FIG. 6 shows signals typical of the accelerometer control system 10 of FIG. 2 when an acceleration is applied. In this case, the mark space ratio servo 16 varies the mark space ratios of the respective duty cycles of the fixed height PWM drive signals 30a, 30b—and accordingly the respective duty cycles of the drive signals 40a, 40b—in response to a displacement of the proof mass 4 in order to counteract this displacement and restore the proof mass 4 to its null position. At first, the charge amplifier 12 produces a square wave output signal 42 and the demodulator 14 receives this square wave output signal 42 and produces a negative error signal 44. This negative error signal is used by the high tension servo 18 to set the control words 34a, 34b such that the drive signal 40a applied to the upper capacitor electrode 6a is increased by an amount $\Delta V$ and the drive signal 40b applied to the lower capacitor electrode 6b is reduced by the same amount ΔV (note that the value of ΔV will not necessarily be the same as described with reference to FIGS. 4 and 5).

However, at time $t_{null}$, the proof mass 4 is restored to the null position even though it is still undergoing acceleration. As such, the output signal 42 of the charge amplifier 12 becomes constant and equal to the reference voltage $V_{ref}$ described previously and the error signal 44 produced by the demodulator 44 drops to 0 V. In turn, the control words 34a, 34b are set such that no significant differential voltage is applied to the capacitor electrodes 6a, 6b. The mark space ratio continues to be linear with the acceleration and so provides a direct means to measure the acceleration experienced by the accelerometer while the accelerometer itself is no longer in the negative spring regime, thus enabling the use of lower resonant frequency MEMS-based accelerometers with higher open loop gain and reducing the impact of bias effects caused by mechanical stressing of the MEMS-based accelerometer.

Thus it will be seen that the present disclosure provides an improved method for control of a closed loop capacitive accelerometer that does not suffer from a negative spring rate. By removing the effect of the negative spring rate, MEMS-based capacitive accelerometers may be implemented with lower resonant frequencies and higher open loop scale factors. This can help to alleviate the bias effects due to mechanical stressing of the MEMS. It will be appreciated by those skilled in the art that the examples described above are merely exemplary and are not limiting on the scope of the invention.

The invention claimed is:

1. An accelerometer closed loop control system comprising:
    a capacitive accelerometer comprising a proof mass moveable relative to first and second fixed capacitor electrodes;
    a pulse width modulation (PWM) generator arranged to generate in-phase and anti-phase PWM drive signals with a drive frequency and an adjustable mark/space ratio, wherein said in-phase and anti-phase PWM drive signals are applied to the first and second fixed capacitor electrodes respectively such that they are charged alternately, wherein the in-phase PWM drive signal has a first amplitude and the anti-phase PWM drive signal has a second amplitude;
    an output signal detector arranged to detect a pick-off signal from the accelerometer representing a displacement of the proof mass from a null position to provide an error signal, wherein the null position is the position of the proof mass relative to the first and second fixed capacitor electrodes when no acceleration is applied;
    a PWM servo operating in closed loop arranged to vary the adjustable mark/space ratio of said in-phase and anti-phase PWM drive signals in response to the error signal so that mechanical inertial forces are balanced by electrostatic forces to maintain the operating point of the proof mass at a null position; and
    a differential voltage servo arranged to vary a difference between the first amplitude of the in-phase PWM drive signal and the second amplitude of the anti-phase PWM drive signal in response to the error signal.

2. The accelerometer closed loop control system as claimed in claim 1, wherein the differential voltage servo comprises a microcontroller arranged to produce first and second digital control words, wherein:
    said first digital control word is input to a first digital to analogue converter arranged to receive the in-phase PWM drive signal at a first reference input and output a scaled in-phase PWM drive signal; and
    said second digital control word is input to a second digital to analogue converter arranged to receive the anti-phase PWM drive signal at a second reference input and output a scaled anti-phase PWM drive signal.

3. The accelerometer closed loop control system as claimed in claim 1, wherein the PWM servo comprises an integral loop filter arranged to vary the adjustable mark/space ratio in response to the integral of the error signal.

4. The accelerometer closed loop control system as claimed in claim 1, wherein the differential voltage servo is arranged to vary the in proportion to the error signal.

5. The accelerometer closed loop control system of claim 1, wherein the error signal is digital.

6. The accelerometer closed loop control system as claimed in claim 1, wherein the output signal detector comprises a charge amplifier having an input connected to the proof mass and an output, said charge amplifier being arranged to produce at its output a voltage proportional to the capacitance between the proof mass and whichever of the first and second capacitor electrodes is charged at any given time.

7. The accelerometer closed loop control system as claimed in claim 6, wherein the output signal detector further comprises a demodulator having an input connected to the output of the charge amplifier, wherein said demodulator is arranged to:
    sample the output of the charge amplifier while the in-phase PWM drive signal is high so as to produce a first sample;
    sample the output of the charge amplifier while the anti-phase PWM drive signal is high so as to produce a second sample; and
    calculate a difference between said first and second samples; and
    produce the error signal, wherein the error signal is dependent on said difference.

8. The accelerometer closed loop control system as claimed in claim 7, wherein the demodulator is further arranged to receive a synchronisation signal, wherein the demodulator uses said synchronisation signal to produce the error signal at a predetermined frequency.

9. The accelerometer closed loop control system as claimed in claim 8, wherein the predetermined frequency is the drive frequency.

10. A closed loop method of controlling a capacitive accelerometer comprising a proof mass moveable relative to first and second fixed capacitor electrodes, the method comprising:
    applying in-phase and anti-phase pulse width modulation (PWM) drive signals to the first and second fixed capacitor electrodes with an adjustable mark/space ratio, wherein the in-phase PWM drive signal has a first amplitude and the anti-phase PWM drive signal has a second amplitude;
    detecting a pick-off signal from the accelerometer representing a displacement of the proof mass from a null position to provide an error signal, wherein the null position is the position of the proof mass relative to the first and second fixed capacitor electrodes when no acceleration is applied;
    operating in closed loop by varying the adjustable mark/space ratio of said in-phase and anti-phase PWM drive signals in response to the error signal so that mechanical inertial forces are balanced by electrostatic forces to maintain the operating point of the proof mass at the null position; and using the error signal so as to vary a difference between the first amplitude of the in-phase PWM drive signal and the second amplitude of the anti-phase PWM drive signal.

11. The closed loop method as claimed in claim 10, further comprising:

produce first and second digital control words;

using said first digital control word and the in-phase PWM drive signal to produce a scaled in-phase PWM drive signal; and using said second digital control word and the anti-phase PWM drive signal to produce a scaled anti-phase PWM drive signal.

12. The closed loop method as claimed in claim 10, wherein the error signal is digital.

13. The closed loop method as claimed in claim 10, further comprising: producing a voltage proportional to the capacitance between the proof mass and whichever of the first and second capacitor electrodes is charged at any given time.

14. The closed loop method as claimed in claim 13, further comprising:

sampling the voltage proportional to the capacitance while the in-phase PWM drive signal is high so as to produce a first sample;

sampling voltage proportional to the capacitance while the anti-phase PWM drive signal is high so as to produce a second sample; and calculating a difference between said first and second samples; and producing the error signal, wherein the error signal is dependent on said difference.

15. The closed loop method as claimed in claim 14, further comprising using a synchronisation signal to produce the error signal at a predetermined frequency.

* * * * *